United States Patent Office 3,190,388
Patented June 22, 1965

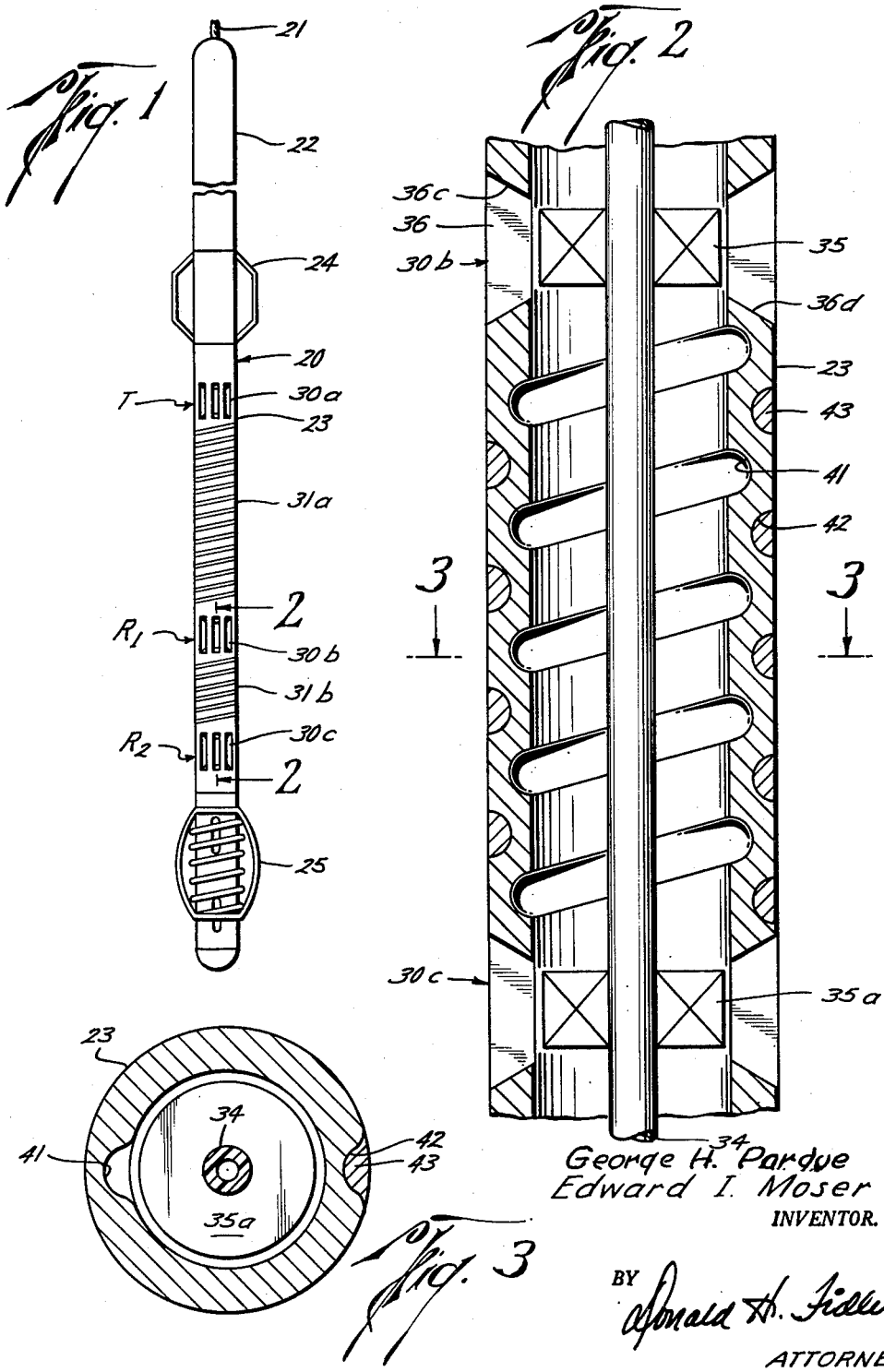

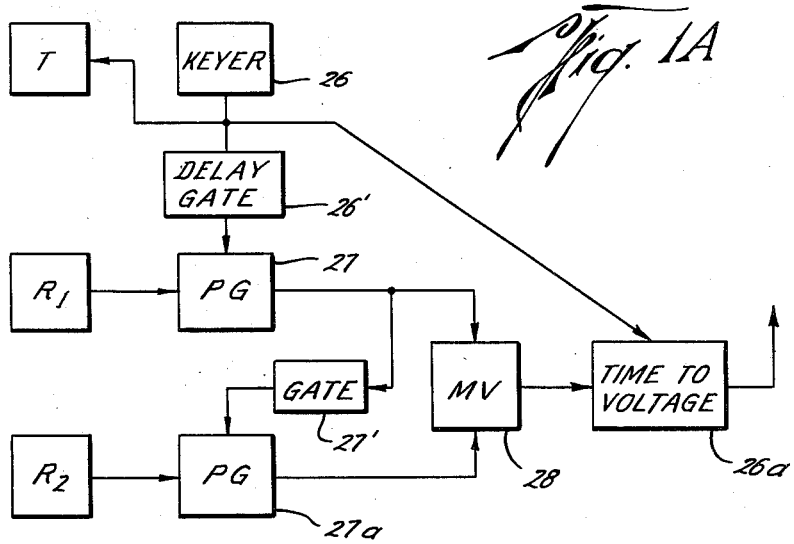
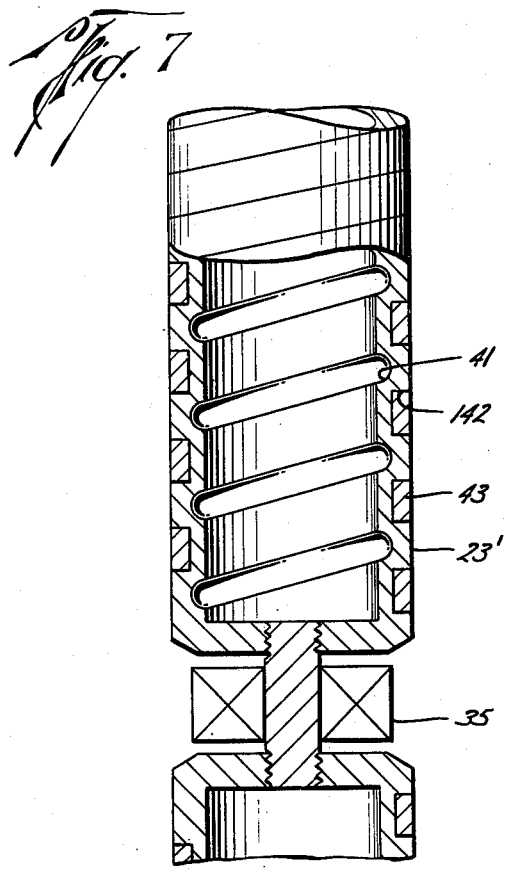
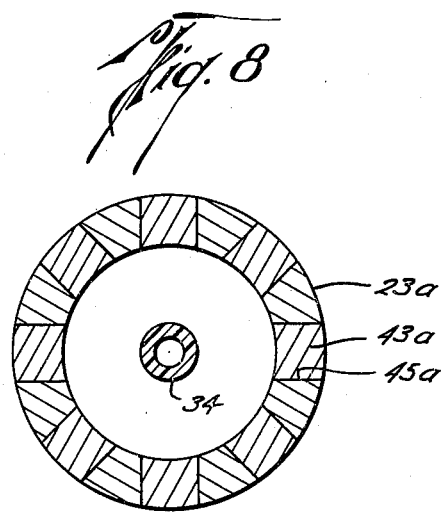
George H. Pardue
Edward I. Moser
INVENTOR.
ATTORNEY

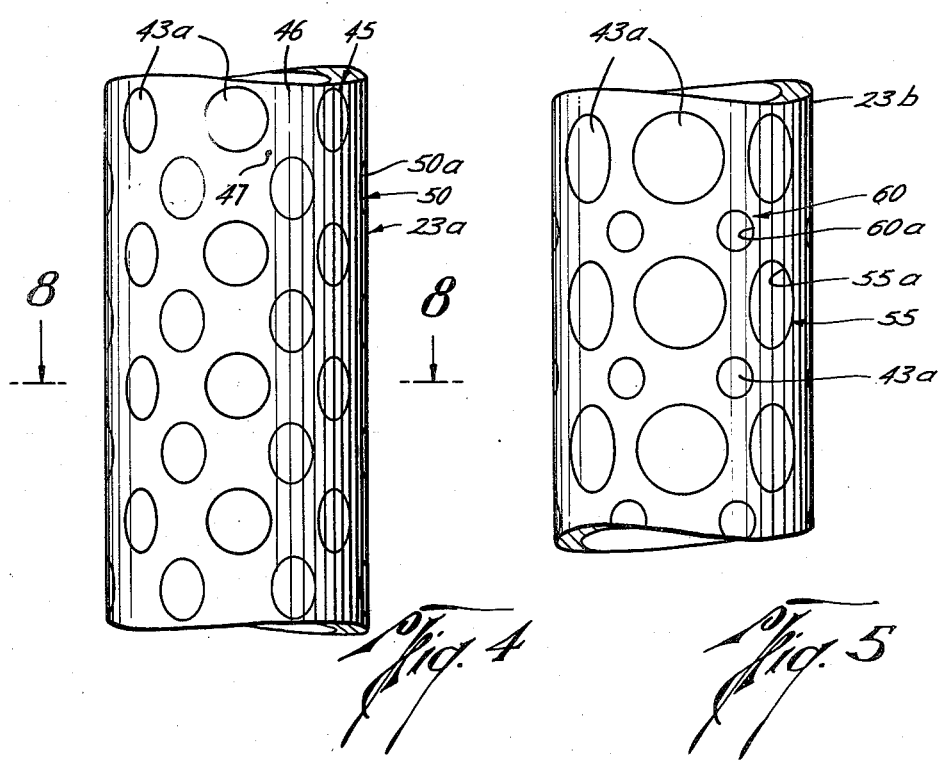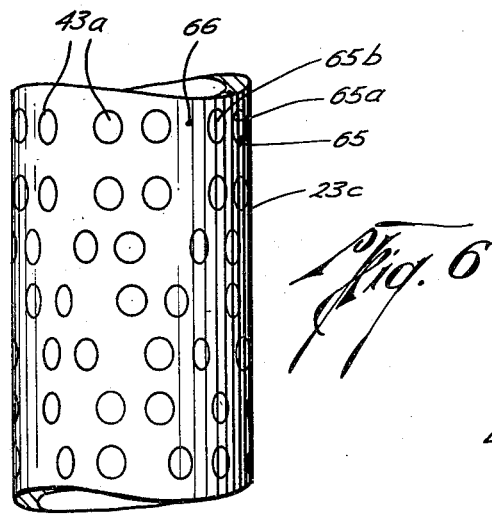

3,190,388
ACOUSTIC LOGGING TOOLS WITH ACOUSTIC ATTENUATING STRUCTURE
Edward I. Moser and George H. Pardue, Houston, Tex., assignors to Schlumberger Well Surveying Corporation, Houston, Tex., a corporation of Texas
Filed May 16, 1961, Ser. No. 110,471
6 Claims. (Cl. 181—.5)

This invention relates to exploratory tools for use in well bores and, more particularly, to acoustic well logging tools which probe the media surrounding a well bore with pulses of acoustic energy.

An acoustic well logging tool is generally cylindrically shaped and suitably sized for passage through a fluid filled well bore. Normally, the tool carries two or more transducers which are disposed and secured at a fixed distance from one another. In a typical acoustic tool having three transducers, one of the transducers serves as a transmitter of sound waves while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected to trigger a timing circuit in the tool which functions to ascertain the time required for a given pulse of acoustic energy to travel the predetermined distance between the two receivers. From a time measurement obtained by the timing circuit, a composite velocity of media traversed by an acoustic pulse can be determined. In turn, composite velocity indications can be correlated to specific types of earth formations or other media. Indications of travel time or velocity obtained in open boreholes can also be related to the porosity of earth formations. If desired, the timing function can be accomplished with only a single transmitter and receiver.

Acoustic energy as above discussed can be generated or intercepted by a piezoelectric or a magnetostrictive transducer in a well known manner.

In a typical open borehole, an acoustic tool is commonly spaced from the wall of the well bore so that the emitted acoustic wave energy or pressure pulses are first omnidirectionally transmitted through the fluid (usually mud) in the well bore and, after traveling through the fluid over the distance from the tool to the wall of the well bore, a portion of the traveling wave energy is transmitted to adjacent earth formations. The characteristic velocity of wave motion or the wave energy through the fluids in the well is generally in the neighborhood of 5000 feet per second, while the characteristic velocity of wave motion through the earth formations may vary from 5000 feet per second to 25,000 feet per second. Thus, the portion of the acoustic wave energy transmitted into the formations generally travels at a higher velocity than the corresponding portion of the wave energy traveling in the well bore fluid. Because of this, the portion of the wave energy traveling through earth formations reaches a receiver prior to the time that the portion of the acoustic wave energy traveling through the fluids does. It is this feature of higher formation velocity which permits measurement of the velocity of acoustic energy in earth formations surrounding a borehole.

Typically, each pulse of acoustic energy upon intercepting a receiver transducer generates an electrical signal containing a number of undulations, cycles or vibrations. The time measurement is generally based upon the detection of a given portion or characteristic of an electrical signal developed at the respective receivers for a given traveling pulse of acoustic energy. A commonly used characteristic of a corresponding electrical signal for detecting purposes, for example, is a voltage amplitude value. This is made possible because the undulations, cycles or vibrations of a typical electrical signal as developed from a typical pulse of acoustic energy generally include, in the first cycle, a first peak of a given polarity followed by a second peak of an opposite polarity and approximately three times the magnitude of the first peak and, in the second cycle, a third peak with a polarity similar to the first peak and about ten times the magnitude of the first peak. Hence, when a selected characteristic voltage amplitude value is exceeded, a detection signal for operating the timing circuit can be developed. The characteristic voltage amplitude value selected for detection purposes is generally such that detection will occur during the first cycle of a signal. The selection of a voltage amplitude characteristic of a first cycle of the signal to detect the first arrival of the acoustic signal is desirable because the voltage amplitude values of subsequent cycles are generally distorted because of acoustic reflections in the borehole.

From the foregoing discussion concerning the nature of acoustic wave propagation in an open borehole and timing of such propagation over a fixed distance, it is apparent that a suitable supporting means for the transducers must be incapable of passing detectable acoustic energy longitudinally between the transducers at a velocity higher than that of the adjacent earth formations. Obviously, if the supporting means are not so constructed, the receiver circuit would be triggered prematurely by the acoustic energy traveling through the support means thereby to prevent the timing circuit from obtaining a time value accurately related to the velocity of the adjacent earth formations or other media.

Heretofore, the housing or support means provided for supporting and spacing the transducers from one another have had low strength characteristics and either (1) a low velocity characteristic, or (2) the support means have had an attenuating characteristic to suppress the amplitude of the energy. In other words, the support means heretofore have acoustically inhibited detectable acoustic energy from triggering the transducer prior to the earliest arrival of the acoustic energy traveling through earth formations. However, to meet these acoustical inhibiting conditions for acoustically blocking the direct sound path, the support means have been complex and expensive to manufacture and have been expensive to maintain and have been lacking in strength qualities for repeated, general field use.

Accordingly, it is an object of the present invention to provide new and improved acoustic logging tools wherein the support has high strength qualities as well as acoustical attenuation and delay characteristics relative to the transmission of detectable acoustic energy lengthwise of the support between transducers.

A further object of the present invention is to provide new and improved acoustic logging tools having a relatively high strength and stiffness to withstand the shocks and forces inherently encountered in a logging operation.

Another object of the present invention is to provide acoustic logging tools with a support strong in tension to facilitate a fishing or retrieving operation if the tool should become temporarily immovable in the well bore.

A still further object of the present invention is to provide a new and improved support for acoustic logging tools which is constructed of metal with an arrangement such that the support alters the intensity and time of arrival of detectable acoustic energy along its length.

Yet another object of the present inventon is to provide a new and improved support for acoustic logging tools in accordance with the foregoing objects which is relatively inexpensive to manufacture and is durable and reliable in field opertions.

Apparatus in accordance with the present invention includes an elongated, relatively stiff, high-strength metallic tubular member for carrying at least two acoustic transducers in a spaced apart relation. The generally tubular configuration of the member is characterized by recesses or open spaces arranged in a pattern about the periphery of the tubular member and along its length. The pattern arrangement is such that successive pairs of points spaced along generatrices of said member are joined by solid portions of the member to form an acoustic path which is substantially longer in distance than the strtaight line distance along a generatrix between such successive pairs of points. The recesses or open spaces in the tubular member are filled with a material having a high mass and a low modulus of elasticity to alter the intensity and velocity of detectable acoustic energy traveling lengthwise of the member.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 1 is a view of an acoustic logging tool embodying the present invention;

FIG. 1A is an electrical schematic diagram of an operating system for the acoustic logging tool, shown in FIG. 1;

FIG. 2 is an enlarged view in longitudinal cross-section taken along line 2—2 of FIG. 1;

FIG. 3 is an enlarged view in cross-section taken along line 3—3 of FIG. 2;

FIGS. 4–6 are front elevation views of portions of housings which display other configurations in which the present invention is embodied;

FIG. 7 is a view of an outer surface of a portion of a tool as well as a partial view in cross-section in which other configurations embodying the present invention are displayed; and FIG. 8 is a view in cross-section taken along line 8—8 of FIG. 4.

In the description to follow, it should be understood that the term "acoustic energy" refers primarily to compressional wave energy although it is not intended to exclude acoustic energy such as shear wave energy, etc. Likewise the term "characteristic velocity" as hereinafter used means the velocity value normally obtained when a pulse of acoustic energy traverses a solid, uninterrupted material object in a straight line path between two fixed points in a given time. The term "detectable" energy or "detectable" acoustic energy as used hereinafter means acoustic energy having a characteristic which is capable of energizing a transducer such that a detecting circuit is responsive to the electrical signal generated in response to the characteristic of the acoustic energy. "Apparent velocity," as hereinafter used, means an apparent velocity value normally obtained when a pulse of detectable acoustic energy traverses a material object, constructed and arranged in accordance with the present invention, between two fixed points lengthwise of the object over a time interval other than would be normally expected for the object in its solid configuration. The term "acoustic path" as hereinafter used means a given solid, substantially continuously connected material providing a medium through which acoustic wave motion may be transmitted.

The present invention is concerned with an acoustic logging tool having an elongated, tubular support constructed of steel for strength and ruggedness. Since the characteristic velocity of acoustic energy in steel is in the neighborhood of 17,000 feet per second and the range of characteristic velocities of the earth formations or media desired to be investigated is from 5,000 to 25,000 feet per second, it will be appreciated why a steel support or housing has heretofore been considered unusable.

Considering first the fact that the characteristic velocity, distance, and time factors are related by the classical expression $S=vt$ so that from any two given values, the third may be reliably calculated, it will be appreciated that for a fixed length of housing, the time factor is inversely related to the velocity factor. Therefore, it would appear that acoustic energy traveling over a fixed length of steel housing which has a characteristic velocity of 17,000 feet per second, would invariably travel over the fixed distance in a fixed time. However, by means of the present invention, the construction of the steel housing can be arranged so that detectable energy travels over a fixed length of housing with an apparent velocity which is considerably less than 17,000 feet per second and in a time interval which is greater than the aforesaid fixed time. In fact, the apparent velocity of a steel housing may be made substantially equal to or less than the characteristic velocity of the fluids in the well bore.

In accordance with the present invention, prime conditions for reducing the characteristic velocity of a length of a tubular support constructed of steel are to substantially eliminate any direct linear path longitudinally of the tubular support and to provide an acoustic interference pattern lengthwise of the housing. Stated another way, the linear continuity of the tubular support in its lengthwise direction is substantially interrupted or disrupted, and by so doing, tortuous acoustic paths are formed. However, the interruption is such that there are remaining longitudinal interconnecting ties which prevent substantial longitudinal flexing of the tubular member. This effectively lengthens the path that acoustic energy must follow and also affects the mechanical characteristics of a support by decreasing the longitudinal unit spring rate of the support and the weight per unit length. The discontinuities in the tubular support are plugged with a material having a high mass and low modulus of elasticity to alter the intensity and apparent velocity of acoustic energy lengthwise of the support.

As will now be explained, a derived relationship between the unit spring rate and weight per unit length can give a fair approximation of the "apparent velocity" of a tubular member with a selected configuration.

From basic physics, it is known that the velocity V in elongated bars and tubes is equal to $$V = \sqrt{\frac{E}{\rho}} \qquad (1)$$

where E is Young's modulus of elasticity and $\rho$ is the mass density. It is also known that the weight density $d$ is equal to $$d = \rho g \qquad (2)$$

where g is the gravitational constant of 32.3 pounds per sec.$^2$. Young's modulus of elasticity E is, of course, equal to $$E = \frac{Pl}{A(\Delta l)} \qquad (3)$$

where P is a force in pounds; $l$ is a length in inches; A is a cross-sectional area in square inches; and $\Delta l$ is a change in length in inches.

Substituting Equations 2 and 3 into Equation 1 and adjusting the units into inches and pounds gives the following equation for velocity $$V = \sqrt{P \frac{(l)}{(\Delta l)} \frac{(l)}{(W)} \frac{(g)}{12}} \qquad (4)$$

Equation 4 can be rearranged as follows:

$$V = \sqrt{\dfrac{g}{12}\dfrac{P}{\dfrac{(\Delta l/e)}{W/e}}} = 1.639\sqrt{\dfrac{s}{w}} \qquad (5)$$

wherein V is velocity in feet per second and where $s$ is the unit spring rate in pounds/in./in., W equals the weight in pounds, and $w$ equals the weight per unit length in pounds/in.

The above derived relationship is considered applicable for deriving an approximate apparent velocity value for a tubular member with void spaces or recesses arranged about its periphery and along its length in such a manner that a substantially non-linear or interrupted acoustic path is provided lengthwise of the housing. The apparent velocity derived from the use of this formula is also understood to be the limiting value of velocity which would be obtained as the frequency of the acoustic energy approaches zero.

The frequency of a pulse of energy produces an effect relative to the above derived relationship which has not been theoretically determined. However, the following effects have been observed. A predominant frequency value for a pulse of energy from a given transmitter can be shown to be the resonant frequency of the transmitter and can be easily determined by measurement of the time period of a cycle. It should be appreciated that a pulse of energy from a transmitter is generally made up of a multitude of frequencies above and below that of the predominant frequency. The intensity of the frequency components is generally a maximum at the predominant frequency and decreases for frequencies above and below the predominant frequency.

The ability of a tubular member to pass sound will depend upon the following:

(1) acoustic path length,
(2) attenuation tendency or inhibition characteristics,
(3) spring rate and mass per unit length.

Disregarding pass bands and other frequency sensitive phenomena, it can be generally stated that the maximum longitudinal velocity will be determined by the interconnected path length. For a given path width, sound frequencies with a quarter-wave length less than the path width are permitted to pass with relatively low resistance. As the frequency is decreased, the quarter-wave length is increased and the resistance to passage increased, causing a reduction in signal intensity. This is also accompanied by a decrease in the speed of transmission. As the frequency continues to decrease, the resistance to passage increases and the speed of propagation decreases until the limiting value based on the spring rate and mass per unit length is reached. From this it can be seen that the apparent detectable velocity will fall somewhere between the values obtained by untit spring rate-mass determination and by a determination of the length of the acoustic path, depending upon the frequency distribution of the acoustic path. As would be expected, with a steel tubular member or housing constructed and arranged to have a given apparent velocity calculated by means of the previously derived relationship, a pulse of energy with, for example, a predominant frequency of 30 kc. generally travels through the housing with an actual apparent velocity which is higher than a calculated apparent velocity derived from the unit spring rate and weight per unit length.

It also will be appreciated from the foregoing relationship as expressed in Formula 5 that the mass and velocity are inversely proportional, i.e. as the mass increases, the velocity decreases.

Turning now to specific illustrations of the present invention, it should be understood that the present invention involves an elongated and generally cylindrical well tool which is to be used in a well bore containing a well fluid. The tool is adapted to be passed through the well bore by means of an armored electrical cable spooled on a surface-located winch and is electrically coupled to surface indicating and recording units.

In FIG. 1 there is illustrated an elongated but rigidly constructed acoustic logging tool 20 adapted for passage in the above described customary manner through a well bore (not shown) by means of an armored electrical cable 21 and winch (not shown) which is situated at the earth's surface. The tool 20 includes an upper, tubular cartridge or housing 22 and a lower, tubular housing 23, both of which are preferably constructed of steel. A single centralizer support device 24 disposed at the center of gravity of the tool 20 may be employed if the tool is to be centered in a well bore. Alternatively, two or more centralized supports disposed along the length of the tool may be employed if so desired. Also, if desired, a caliper device 25 for measuring the diameter of the well bore may be coupled to the tool 20, for example, at its lower end as shown in the drawing.

Within the upper cartridge 22 are electronic components and circuits to periodically actuate the transmitter T and to perform the measuring function in response to signals from the receivers $R_1$ and $R_2$. The electronic circuits are coupled via cable 21 to conventional surface indicating and recorder instruments (not shown). Briefly, the measuring function may be accomplished by circuits as shown in FIG. 1A wherein a keying circuit 26 periodically triggers the transmitter T to emit a pulse of acoustic energy. The keying circuit also conditions a pulse generator 27 for operation after a predetermined time interval which is fixed by a delay gate 26'. The predetermined time interval is, of course less than the time required for an emitted pulse of acoustic energy to reach the receiver $R_1$. The keying circuit also provides a reset pulse to reset a time to voltage circuit 26a. At the time the first receiver $R_1$ senses the acoustic energy emitted by the transmitter T, a characteristic of the electrical signal developed by the receiver $R_1$ is used to trigger the pulse generator 27 to produce an output pulse. The output pulse of generator 27 triggers a multivibrator 28 into operation and also operatively conditions a pulse generator 27a for operation by means of a gate circuit 27". Thereafter the acoustic pulse arriving at receiver $R_2$ similarly triggers the pulse generator 27a to produce an output pulse which triggers the multivibrator 28 into an inoperative condition. The time interval $\Delta t$ between the output pulses of the pulse generators 27 and 27a is converted by a time to voltage circuit 26a into a voltage signal for transmission to the surface instruments via the cable 21.

As shown in FIG. 1, the lower, tubular housing 23 includes three illustrative and similarly formed transducer sections identified by the number 30 and differentiated from one another by the letters $a$, $b$ and $c$. Transducer sections 30 may be separated from one another by identically formed acoustic inhibiting sections identified by the number 31 and differentiated from one another by the letters $a$ and $b$. In general, each transducer section 30 is constructed and arranged to permit and to facilitate the travel of acoustic energy in a generally radial pattern between a transducer within the tubular housing and the fluids or muds (not shown) in the well bore which are exterior of the tubular housing. Also, in general, each acoustic inhibiting section 31 is constructed and arranged so as to increase the apparent time required for detectable energy to travel over the portions of the housing between transducer sections 30.

As schematically shown in FIG. 2, exemplary magneto-strictive transducers 35 and 35a can be secured in any convenient manner to a tubular support rod 34 having a low velocity characteristic. For example, rod 34 can be constructed of "Teflon," which has a characteristic velocity of 4400 feet per second. While not shown, the electrical conductors for the exemplary transducers 35 and 35a may be passed through openings (not shown) in rod 34 to the electronic cartridge housing 22.

Transducers 35 and 35a are conventional in the art and need not be further described. The support rod 34 can be connected (not shown) in any suitable and convenient manner relative to the lower housing 23 so that the transducers 35 and 35a are disposed in a generally central position relative to the cross section of the lower housing 23 and generally in a central position relative to the length of a transducer section 30. Alternatively, the transducers could be directly attached to the interior of the housing in any suitable manner if so desired.

A transducer section 30, as illustrated in FIGS. 1 and 2, comprises a plurality if openings 36 in the housing 23, which are generally rectangularly shaped lengthwise of the housing and are equidistantly spaced from one another about the periphery of the housing. The width of an opening 36 is defined between parallel and longitudinally extending side surfaces and is generally equal to the width of the sections or portions of housing disposed between adjacent openings 36. The length of an opening 36 is defined between upper and lower inside end surfaces 36c, 36d, which slope inwardly towards one another from the outer surface of the housing 23 to its inner surface. The length of the openings 36 generally should be equal to or greater than the longitudinal dimension of a transducer 35 within the housing. Since a typical magnetostrictive transducer has an appreciable longitudinal dimension (2" to 3" in a typical instrument) the openings 36 are illustrated as elongated in a direction lengthwise of the housing. The sections of the housing between the openings 36 provide excellent stress bearing qualities. Preferably, there are from 8 to 12 such openings 36 spaced about the periphery of the housing for a magnetostrictive transducer which emits primarily radial pressure waves. This range of openings has been found to provide an efficiency of transmission of sound radially from or into the housing, which ranges from 98% to virtually 100%.

Each acoustic inhibiting section 31 is constructed and arranged to provide void or recessed spaces about the periphery and along the length of the housing 23 which form a generally tortuous configuration. Hence, acoustic wave transmission lengthwise of the housing occurs by traveling tortuous paths which extend between successive points spaced along a generatrix of the lower housing 23 and which are greater than the straight line distance between a successive pair of points.

The invention as illustrated in FIGS. 1–3 involves the steel tubular housing 23 in which inner and outer spiralling generally U shaped or semi-circular grooves 41 and 42 have been cut. Each of the grooves spirals in a similar manner and has the same pitch. The grooves 41 and 42 are, however, displaced at 180° relative to one another. (Note view from a horizontal cross-section as in FIG. 3.) The depth of the grooves 41 and 42 is such that the lowest portion of each groove extends beyond a mid-point between the inner and outer walls of the housing 23. In this manner, a linear path lengthwise of the housing is interrupted. The spacing between the inner and outer grooves lengthwise of the housing is made less than one quarter wave length of the principal frequency of the acoustic energy. The pitch of the grooves is made such that energy traveling in a helical path through the solid portion separating the grooves will be delayed by the extra path length created.

More specifically, in explanation of the above described arrangement, there are two primary paths of sound transmission which may exist. Considering a first path as the continuous helical strip of the housing it will be appreciated that an acoustic impulse will travel along this helical strip at the velocity of sound in steel. The time required for an acoustic impulse to travel such a helical path is dependent upon the helix angle of the strip. To calculate an appropriate helix angle the following example is provided: let $t_1$ be equal to the time required for an acoustic impulse to travel a length $h$ along the helix at a velocity $c$ where $c$ is equal to the characteristic velocity of steel. Let $t_2$ be equal to the time required for an acoustic impulse to travel a distance $l$ through the adjacent media in a generally vertical direction with a velocity of $c_2$ where $c_2$ is equal to the minimum significant media velocity to be considered. If the times $t_1$ and $t_2$ are set equal to one another, then the cosine of the angle $\phi$, where $\phi$ is the helix angle, is equal to the minimum media velocity $c_2$ divided by the velocity of steel $c$. Using the values of 5000 feet per second as a lowest media velocity to be considered and 17,000 feet per second as the velocity of steel, the helix angle $\phi$ is calculated to be about 72°.

A second path of sound transmission would be along the length of the housing parallel to the central axis of the housing. In this instance, the grooves serve to break up the straight line path lengthwise of the housing and, at low frequencies of acoustic impulses, the apparent velocity can be calculated from the Formula 5. For high frequency acoustic impulses, the transmission effects are minimized by keeping the sections of the housing wall between the grooves small with respect to the wave length of the acoustic impulses.

With only the foregoing construction, the housing would have an apparent velocity of about 12,000 feet per second. However, by means of the present invention, this apparent velocity can be further decreased by the filling or plugging of the outer groove 42 with a material 43 having a high density and a low modulus of elasticity. A suitable material is, for example, lead. The addition of material 43 effectively increases the mass and therefore decreases the apparent velocity. Attenuation of acoustic energy occurs by virtue of the acoustic impedance mismatch and the nature of the material 43 with a low modulus of elasticity characteristically having high attenuation.

In FIG. 7, another form which the housing 23' may assume is illustrated. In particular, housing 23', at the end of the acoustic inhibiting section, is reduced in diameter by means of a connecting stub member 35' on which the transducer 35 is mounted. It will be readily apparent that mounting of the transducers in this manner can easily be accomplished by one skilled in the art. Housing 23' may be arranged similar to housing 23 and include an inner groove 41 and an outer groove 142. Groove 142 may be increased to a greater cross-sectional area than groove 42 of member 23. Hence, the larger cross-section permits the use of more loading material 43 with a greater decrease in apparent velocity than the velocity decrease of the embodiment illustrated in FIGS. 1–3.

As shown in FIG. 4 the pattern of an acoustic inhibiting section can be modified in a somewhat different manner than the previously described patterns. The pattern which prevails over the length of the housing 23a between transducer sections (not shown) and as illustrated in FIG. 4 consists of groups 45 and 50 of cylindrical openings which alternate along the length of the housing. A first set or group 45 of openings includes eight openings 45a (FIG. 8) which are equidistantly spaced from one another about the periphery of the housings and respectively have their centers lying in a plane perpendicular to the central axis of the housing. Generally, a section 46 of the housing between adjacent openings along the perpendicular plane should be approximately equal to the diameter of an opening 45a. The second group 50 of openings similarly includes eight openings 50a which are equidistantly disposed about the periphery of the housing and have their centers lying in a plane perpendicular to the central axis of the housing. To interrupt the linear acoustic path lengthwise of the housing, the second group 50 of openings is displaced angularly relative to a first group 45 of openings and has portions thereof disposed intermediate the space between openings in group 45 so that only thin interconnecting angularly disposed portions 47 of the housing remain. Housing portions 47 increase the length of acoustic path longitudinally of the housing. Each of the openings 45a and 50a receives a cylindrical plug 43a of lead which is suitably secured to the steel housing 23a.

Referring now to FIG. 5, a pattern similar to that described in connection with FIG. 4 is disclosed. In this pattern, the circular openings 55a in one group 55 have diameters twice as great as the diameters of the circular openings 60a of the second group 60. Only six openings about the periphery of the housing are provided in each of the groups 55 and 60. The portions of the housing 23b which equidistantly space the larger openings 55a from one another are substantially equal to the diameter of the smaller openings 60a while the portions of the housing which equidistantly space the smaller openings 60a from one another are substantially equal to the diameter of the larger openings 55a. The axes of the larger openings of groups 55 are displaced at an angle of 30° from the axes of the smaller openings of the groups 60. The longitudinal displacement between adjacent planes on which the centers of the openings of the respective groups lie is substantially equal the sum of the radii of a large and a small opening. Each of the openings 55a and 60a receive a cylindrical plug 43a of lead which is suitably secured to the steel housing 23b.

In FIG. 6, still another configuration is illustrated wherein a group 65 of openings on a plane perpendicular to the longitudinal axis of the housing includes a plurality of pairs of adjacent openings 65a and 65b wherein the pairs of openings are spaced from one another about the periphery of the housing by short sections 66 of the housing. Each of the openings in a pair have central axes which respectively intersect the central longitudinal axis of the housing and the spacing between adjacent openings 65a and 65b is less than the spacing between pairs such that there is relatively little metal extending longitudinally in a direct line between adjacent openings of a pair. The short sections 66 of housing which separate adjacent pairs of openings is approximately equal to one half the diameters of an opening.

The group 65 of openings is repeated along the length of the housing but at different angular orientations relative to the periphery of the housing. The different angular orientation may be random or randomly systematic to disrupt the direct acoustic path lengthwise of the housing. Each of the openings 65a, 65b receive a cylindrical plug 43a of lead which is suitably secured to the steel housing 23c.

From the foregoing description of the present invention it will be appreciated how to provide an acoustic logging tool with a tubular housing so constructed to substantially eliminate uniform longitudinal paths to inhibit the immediate transmission of detectable acoustic energy therealong wherein such a housing is loaded with a high density material having a low modulus of elasticity.

In the disclosed arrangements, the transducers are so arranged that they are exposed to well fluids. However, if desired, the housing could be enclosed or plugged with a rubber or other low velocity composition to provide a fluid tight housing. In such an arrangement, the interior of the fluid tight housing would be oil-filled for sound transmission purposes.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

We claim:

1. Apparatus for use in well bores comprising: an elongated, rigid tubular member of a material having a relatively high characteristic acoustic velocity; at least two acoustic transducers in a fixed, spaced relationship relative to one another along a section of said tubular member; said tubular member having a configuration between said acoustic transducers arranged to alter the intensity and time of arrival of detectable acoustic energy traveling through and longitudinally of said tubular member, such configuration including interruptions in the longitudinal continuity of said tubular member to provide tortuous alternative paths for passage of acoustic energy, which paths are longer than the longitudinal spacing between said transducers, and material secured to said member in said interruptions, said material having a high density and low modulus of elasticity relative to the material of said member and being adequate to change the weight of the tubular member independently of its unit spring rate and thereby further alter the intensity and time of arrival of detectable acoustic energy.

2. Apparatus for use in well bores comprising: an elongated, rigid, tubular member of a material having a relatively high characteristic acoustic velocity; at least two acoustic transducers in a fixed, spaced relationship relative to one another along a section of said tubular member; said tubular member having a configuration between said acoustic transducers arranged to alter the intensity and time of arrival of detectable acoustic energy traveling through and longitudinally of said tubular member; such configuration including perforations along the length of said tubular member substantially interrupting the longitudinal continuity of said tubular member, and material filling said perforations, said material having a high density and, low modulus of elasticity relative to the material of said member and being adequate to change the weight of the tubular member independently of its unit spring rate and thereby further alter the intensity and time of arrival of detectable acoustic energy.

3. Apparatus for use in well bores comprising: an elongated, rigid, tubular member of steel; at least two acoustic transducers in a fixed, spaced relationship relative to one another along a section of said tubular member; said tubular member having a configuration between said acoustic transducers arranged to alter the intensity and time of arrival of detectable acoustic energy traveling through and longitudinally of said tubular member; such configuration including interruptions in the longitudinal continuity of said tubular member forming a series of interlinking metallic segments providing tortuous paths for passage of acoustic energy which paths are longer than the longitudinal spacing between said transducers, and material secured to said interruptions in said tubular member, said material having a high density and low modulus of elasticity relative to the material of said member and being adequate to change the weight of the tubular member independently of its unit spring rate and thereby further alter the intensity and time of arrival of detectable acoustic energy.

4. Apparatus for use in well bores comprising: an elongated, rigid, tubular member of steel; at least two acoustic transducers carried in a fixed, spaced relationship relative to one another along a section of said tubular member; said tubular member having a configuration between said acoustic transducers arranged to alter the intensity and time of arrival of detectable acoustic energy traveling through and longitudinally of said tubular member; such configuration including interruptions in the longitudinal continuity of said tubular member forming a series of interlinking metallic segments providing tortuous paths for passage of acoustic energy which paths are longer than the longitudinal spacing between said transducers, the width of such paths being a quarter wave length or less than that of the predominant frequency of an acoustic signal traveling between said transducers, said interruptions serving to alter a relationship between the unit spring rate of said tubular member and the weight per unit of length so as to increase the transit time of detectable acoustical energy between said transducers while maintaining the rigidity of said tubular member with respect to bending moments, and material secured to said tubular member in said interruptions, said material having a high density and a low modulus of elasticity relative to the material of said member and being adequate to change the weight of the tubular member independently of its unit spring rate and thereby further alter the intensity and time of arrival of detectable acoustic energy.

5. Apparatus for use in well bores comprising: an elongated, rigid, tubular member of steel; at least two acoustic transducers carried in a fixed, spaced relationship relative to one another along a section of said tubular member; said tubular member having a configuration between said acoustic transducers arranged to alter the intensity and time of arrival of detectable acoustic energy traveling through and longitudinally of said tubular member; such configuration including interruptions in the longitudinal continuity of said tubular member forming a series of interlinking metallic segments providing tortuous paths for passage of acoustic energy which paths are longer than the longitudinal spacing between said transducers, the width of such paths being a quarter wave length or less than that of the predominant frequency of an acoustic signal traveling between said transducers, said interruptions serving to increase the travel time of detectable acoustic energy traveling between said transducers in accordance with the formula $$t = \frac{S}{\sqrt{\frac{gs}{12w}}}$$

where $t$ equals time, $S$ equals the distance between transducers, $g$ equals the gravitational constant, $s$ equals the unit spring rate and $w$ equals the weight per unit of elongation, and material secured to said member in said interruptions, said material having a high density and a low modulus of elasticity relative to the material of said member and being adequate to change the weight per unit of length independently of the unit spring rate and thereby further alter the intensity and time of arrival of detectable acoustic energy.

6. Apparatus for surveying well bores comprising: an elongated, rigid, metallic, tubular member; at least two acoustic transducers supported by said tubular member, said tubular member having a configuration between said acoustic transducers arranged to alter the intensity and time of arrival of detectable acoustic energy traveling through and longitudinally of said tubular member, such configuration including recesses extending inwardly from the inner and outer walls of said tubular member so as to interrupt the linear continuity of the wall of the tubular member and thereby provide a tortuous path for acoustic energy traveling along said tubular member, such recesses thereby reducing the amount of metal in said tubular member so that the relationship between the unit spring rate and weight per unit of length substantially determine the acoustic velocity for acoustic energy traveling the distance between said transducers, the width of such path being a quarter wave length or less than that of the predominant frequency of the acoustic signal to attenuate acoustic signals with a lower frequency than the predominant frequency, and material secured to said recesses, said material having a high density and a low modulus of elasticity relative to the material of said member and being adequate to change the weight of the tubular member independently of its unit spring rate and thereby further alter the intensiy and time of arrival of detectable acoustic energy.

References Cited by the Examiner

UNITED STATES PATENTS

| 1,678,116 | 7/28 | Harrison | 340—17 |
| 2,648,056 | 8/53 | Jakosky. | |
| 2,834,421 | 5/58 | Summers | 181—.5 |
| 2,938,592 | 5/60 | Charske et al. | 181—.5 |
| 2,994,398 | 8/61 | Engle et al. | 181—.5 |
| 3,054,471 | 9/62 | Knudsen | 181—.5 |

FOREIGN PATENTS 163,459   6/55   Australia.

SAMUEL FEINBERG, *Primary Examiner.*
ARNOLD RUEGG, KATHLEEN H. CLAFFY,
*Examiners.*